(12) United States Patent
Jang et al.

(10) Patent No.: US 10,742,318 B2
(45) Date of Patent: Aug. 11, 2020

(54) S2-PSK OPTICAL WIRELESS COMMUNICATION METHOD AND APPARATUS

(71) Applicant: KOOKMIN UNIVERSITY INDUSTRY ACADEMY COOPERATION FOUNDATION, Seoul (KR)

(72) Inventors: Yeong Min Jang, Seoul (KR); Van Trang Nguyen, Seoul (KR); Chang Hyun Hong, Goyang (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 16/069,822

(22) PCT Filed: Nov. 28, 2016

(86) PCT No.: PCT/KR2016/013776
§ 371 (c)(1),
(2) Date: Feb. 7, 2019

(87) PCT Pub. No.: WO2017/122924
PCT Pub. Date: Jul. 20, 2017

(65) Prior Publication Data
US 2019/0356385 A1    Nov. 21, 2019

(30) Foreign Application Priority Data

Jan. 12, 2016 (KR) .......................... 10-2016-0003874
Jul. 25, 2016 (KR) .......................... 10-2016-0094446
Oct. 27, 2016 (KR) .......................... 10-2016-0141383

(51) Int. Cl.
*H04B 10/116* (2013.01)
*H04B 10/556* (2013.01)
(Continued)

(52) U.S. Cl.
CPC ....... *H04B 10/116* (2013.01); *H04B 10/5561* (2013.01); *H04B 10/676* (2013.01); *H04N 7/22* (2013.01)

(58) Field of Classification Search
CPC .................................................. H04B 10/116
See application file for complete search history.

(56) References Cited

U.S. PATENT DOCUMENTS

2014/0286644 A1\* 9/2014 Oshima .................. H04B 10/11
                                                                   398/118
2017/0373753 A1\* 12/2017 Darabi ................. H04B 10/116

FOREIGN PATENT DOCUMENTS

JP        2011-009805 A       1/2011
KR    10-2009-0043059 A       5/2009
(Continued)

OTHER PUBLICATIONS

Almer, Oscar et al., "4-PAM Visible Light Communications with a XOR-tree Digital Silicon Photomultipliern", In: Summer Topicals Meeting Series (SUM), pp. 41-42, Jul. 13-15, 2015.
(Continued)

*Primary Examiner* — Nathan M Cors
(74) *Attorney, Agent, or Firm* — Novick, Kim & Lee, PLLC; Sang Ho Lee (57) ABSTRACT

An optical wireless communication apparatus includes: a modulator for generating a reference signal including periodically repeating binary zeros and ones, receiving an input of a first binary data signal, and outputting a second binary data signal, wherein the second binary data signal has the same frequency as the reference signal, and has the same
(Continued)

phase as the reference signal when the first binary data signal comprises binary zeros and has an opposite phase to the reference signal when the first binary data signal comprises binary ones, or has the same phase as the reference signal when the first binary data signal comprises binary ones and has an opposite phase to the reference signal when the first binary data signal comprises binary zeros, and a transmitter for turning a first light source on or off according to the reference signal, and turning a second light source on or off according to the second binary data signal.

17 Claims, 9 Drawing Sheets

(51) Int. Cl.
*H04B 10/67* (2013.01)
*H04N 7/22* (2006.01)

(56) References Cited

FOREIGN PATENT DOCUMENTS

| KR | 10-2012-0118747 A | 10/2012 |
| KR | 10-1472583 B1 | 12/2014 |
| KR | 10-1568943 B1 | 11/2015 |

OTHER PUBLICATIONS

Jang, Yeong Min et al., "Kookmin University PHY Sub-proposal for ISC Using Dimmable Spatial M-PSK (DSM-PSK)", doc.: IEEE 802.15-16-0015-00-007a, Jan. 10, 2016 (https://mentor.ieee.org/802.15/documents?n=686s.group=007a).

* cited by examiner

S2-PSK OPTICAL WIRELESS COMMUNICATION METHOD AND APPARATUS

TECHNICAL FIELD

The present invention relates to an S2-PSK optical wireless communication method and an apparatus thereof.

BACKGROUND ART

Recently, as the Visible Light Communication (VLC) technique, which enables wireless communication by adding communication functions to a visible light wavelength using an infrastructure in which lighting of incandescent bulbs or fluorescent tubes is replaced by Light Emitting Diode (LED) lighting, is actively studied and IEEE 802.15.7 international standard specification is completed, development of business models for commercialization is in progress. However, since IEEE 802.15.7 is generally limited to data transmission using a photo diode (PD), it has a problem in that a dedicated communication apparatus such as a VLC dongle or the like should be used. Accordingly, international standardization of Optical Wireless Communications (OWC), which mainly uses an image sensor such as a camera of a smart phone rather than a photo diode and includes infrared and ultraviolet wavelengths, as well as visible light, is progressed in IEEE 802.15.7r1 OWC TG (Task Group).

The inventor of the present invention is the chairman of IEEE 802.15.7r1 OWC TG of International Standard Organization, leading OWC international standardization by presenting many contributions related to OWC techniques, and the present invention relates to the Spatial 2-Phase Shift Keying (S2-PSK) modulation method, which is one of most essential techniques of OWC international standard techniques.

DISCLOSURE OF INVENTION

Technical Problem

The present invention provides an optical wireless communication method using LEDs and an image sensor and an apparatus thereof.

Technical Solution

An optical wireless communication apparatus according to an embodiment of the present invention includes a modulator and a transmitter, wherein the modulator generates a reference signal periodically repeating binary value 0s and 1s, receives an input of a first binary data signal, and outputs a second binary data signal, wherein the second binary data signal has a frequency the same as that of the reference signal, and a phase the same as that of the reference signal when the first binary data signal is a binary value 0 and a phase opposite to that of the reference signal when the first binary data signal is a binary value 1, or a phase the same as that of the reference signal when the first binary data signal is a binary value 1 and a phase opposite to that of the reference signal when the first binary data signal is a binary value 0; and the transmitter turns on and off a first light source according to the reference signal and turns on and off a second light source according to the second binary data signal.

In an embodiment, the second binary data signal has a phase the same as that of the reference signal when the first binary data signal is a binary value 0 and a phase opposite to that of the reference signal when the first binary data signal is a binary value 1.

In an embodiment, the optical wireless communication apparatus further includes a line encoder for receiving an input of a third binary data signal, encoding the third binary data signal at a code rate of 1/2, and outputting the first binary data signal, wherein the line encoder outputs a binary value (0, 0) or (1, 1) when the input signal is a binary value 0 and a binary value (0, 1) or (1, 0) when the input signal is a binary value 1, or a binary value (0, 1) or (1, 0) when the input signal is a binary value 0 and a binary value (0, 0) or (1, 1) when the input signal is a binary value 1.

In an embodiment, the line encoder outputs a binary value (0, 0) when the input signal is a binary value 0 and a binary value (0, 1) when the input signal is a binary value 1.

In an embodiment, the modulator receives an input of a third binary data signal and outputs a fourth binary data signal, wherein the fourth binary data signal has a frequency the same as that of the reference signal, and a phase the same as that of the reference signal when the third binary data signal is a binary value 0 and a phase opposite to that of the reference signal when the third binary data signal is a binary value 1, or a phase the same as that of the reference signal when the third binary data signal is a binary value 1 and a phase opposite to that of the reference signal when the third binary data signal is a binary value 0; and the transmitter turns on and off a third light source according to the fourth binary data signal.

An optical wireless communication apparatus according to an embodiment of the present invention includes a receiver and a demodulator, wherein the receiver receives consecutively photographed images from an image sensor; and the demodulator outputs a first binary data signal of a binary value 0 when an ON/OFF phase of a first light source on the images is the same as an ON/OFF phase of a second light source on the images and a binary value 1 when the ON/OFF phase of the first light source is opposite to the ON/OFF phase of the second light source, or a binary value 1 when the ON/OFF phase of the first light source is the same as the ON/OFF phase of the second light source and a binary value 0 when the ON/OFF phase of the first light source is opposite to the ON/OFF phase of the second light source, on the basis of the images.

In an embodiment, the demodulator outputs the first binary data signal of a binary value 0 when the ON/OFF phase of the first light source on the images is the same as the ON/OFF phase of the second light source on the images and a binary value 1 when the ON/OFF phase of the first light source is opposite to the ON/OFF phase of the second light source.

In an embodiment, the optical wireless communication apparatus further includes a light source detector for detecting positions of the first light source and the second light source from the images, wherein the demodulator outputs the first binary data signal on the basis of the detected positions of the first light source and the second light source.

In an embodiment, the light source detector includes an artificial neural network for detecting the positions of the first light source and the second light source, wherein the artificial neural network includes a first neuron layer and a second neuron layer, and each of the first neuron layer and the second neuron layer includes a convolution layer and an RoI pooling layer, and the light source detector reads previous positions of the first light source and the second light source, builds a learning data set for the artificial neural network on the basis of the previous positions, obtains an output of the artificial neural network using the learning data set as an input, obtains, if an error in the output does not satisfy a targeted error, an output of the artificial neural network using the learning data set as an input after updating weighting factors of the artificial neural network by backpropagation, and outputs, if the error in the output satisfies the targeted error, the positions of the first light source and the second light source.

In an embodiment, the demodulator includes an artificial neural network for calculating an XOR value or an NXOR value of the ON/OFF states of the first light source and the second light source considering noise, wherein the artificial neural network includes a first hidden layer having five neurons and a second hidden layer having three neurons, all the neurons of the artificial neural network are completely connected, and an activation function of the first and second hidden layers is a tan-sigmoid function, and the demodulator reads ON/OFF states of the first light source and the second light source, builds a learning data set for the artificial neural network on the basis of the ON/OFF states, obtains an output of the artificial neural network using the learning data set as an input, obtains, if an error in the output does not satisfy a targeted error, an output of the artificial neural network using the learning data set as an input after updating weighting factors of the artificial neural network by backpropagation, and outputs, if the error in the output satisfies the targeted error, the XOR value or the NXOR value of the ON/OFF states of the first light source and the second light source.

In an embodiment, the optical wireless communication apparatus further includes a line decoder for receiving an input of a first binary data signal, decoding the first binary data signal at a code rate of 1/2, and outputting a second binary data signal, wherein the line decoder outputs a binary value 0 when the input signal is a binary value (0, 0) or (1, 1) and a binary value 1 when the input signal is a binary value (0, 1) or (1, 0), or a binary value 1 when the input signal is a binary value (0, 0) or (1, 1) and a binary value 0 when the input signal is a binary value (0, 1) or (1, 0).

In an embodiment, the line decoder outputs a binary value 0 when the input signal is a binary value (0, 0) or (1, 1) and a binary value 1 when the input signal is a binary value (0, 1) or (1, 0).

In an embodiment, the receiver receives images photographed in a rolling shutter method from the image sensor.

In an embodiment, the light source detector detects a position of a third light source from each of the images, and the demodulator outputs a second binary data signal of a binary value 0 when the ON/OFF phase of the first light source is the same as an ON/OFF phase of the third light source and a binary value 1 when the ON/OFF phase of the first light source is opposite to the ON/OFF phase of the third light source, or a binary value 1 when the ON/OFF phase of the first light source is the same as the ON/OFF phase of the third light source and a binary value 0 when the ON/OFF phase of the first light source is opposite to the ON/OFF phase of the third light source, on the basis of positions of the first light source and the third light source.

An optical wireless communication apparatus according to an embodiment of the present invention includes a receiver and a demodulator, wherein the receiver receives consecutively photographed images from an image sensor; and the demodulator demodulates data from the images according to an equation of bit=XOR$\{S_1(k); S_2(k)\}$.

In the above equation, $S_1(k)$ and $S_2(k)$ denote respectively an ON/OFF state of a first light source and an ON/OFF state of a second light source in a k-th image.

An optical wireless communication apparatus according to an embodiment of the present invention includes a receiver and a demodulator, wherein the receiver receives consecutively photographed images from an image sensor; and the demodulator demodulates data from the images according to an equation of bit=XOR[XOR$\{s_1(k); s_2(k)\}$; XOR$\{s_1(k+1); s_2(k+1)\}$].

In the above equation, $S_1(k)$ and $S_2(k)$ respectively denote an ON/OFF state of a first light source and an ON/OFF state of a second light source in a k-th image.

An optical wireless communication method according to an embodiment of the present invention includes: generating, by a modulator, a reference signal periodically repeating binary value 0s and 1s; receiving, by the modulator, an input of a first binary data signal; outputting, by the modulator, a second binary data signal having a frequency the same as that of the reference signal, and a phase the same as that of the reference signal when the first binary data signal is a binary value 0 and a phase opposite to that of the reference signal when the first binary data signal is a binary value 1, or a phase the same as that of the reference signal when the first binary data signal is a binary value 1 and a phase opposite to that of the reference signal when the first binary data signal is a binary value 0; and turning on and off, by a transmitter, a first light source according to the reference signal, and turning on and off a second light source according to the second binary data signal.

In an embodiment, the optical wireless communication method further includes receiving an input of a third binary data signal, encoding the third binary data signal at a code rate of 1/2, and outputting the first binary data signal, by a line encoder, wherein the line encoder outputs a binary value (0, 0) or (1, 1) when the input signal is a binary value 0 and a binary value (0, 1) or (1, 0) when the input signal is a binary value 1, or a binary value (0, 1) or (1, 0) when the input signal is a binary value 0 and a binary value (0, 0) or (1, 1) when the input signal is a binary value 1.

An optical wireless communication method according to an embodiment of the present invention includes: receiving, by a receiver, consecutively photographed images from an image sensor; and outputting, by a demodulator, a first binary data signal of a binary value 0 when an ON/OFF phase of a first light source of the images is the same as an ON/OFF phase of a second light source of the images and a binary value 1 when the ON/OFF phase of the first light source is opposite to the ON/OFF phase of the second light source, or a binary value 1 when the ON/OFF phase of the first light source is the same as the ON/OFF phase of the second light source and a binary value 0 when the ON/OFF phase of the first light source is opposite to the ON/OFF phase of the second light source, on the basis of the images.

In an embodiment, the optical wireless communication method further includes detecting, by a light source detector, positions of the first light source and the second light source from the images, wherein outputting a first binary data signal is performed on the basis of the detected positions of the first light source and the second light source.

In an embodiment, the light source detector includes an artificial neural network for detecting the positions of the first light source and the second light source, wherein the artificial neural network includes a first neuron layer and a second neuron layer, and each of the first neuron layer and the second neuron layer includes a convolution layer and an RoI pooling layer, and detecting, by the light source detector, the positions of the first light source and the second light source includes: reading previous positions of the first light source and the second light source; building a learning data set for the artificial neural network on the basis of the previous positions; obtaining an output of the artificial neural network using the learning data set as an input; obtaining, if an error in the output does not satisfy a targeted error, an output of the artificial neural network using the learning data set as an input after updating weighting factors of the artificial neural network by backpropagation; and outputting, if the error in the output satisfies the targeted error, the positions of the first light source and the second light source.

In an embodiment, the demodulator includes an artificial neural network for calculating an XOR value or an NXOR value of the ON/OFF states of the first light source and the second light source considering noise, wherein the artificial neural network includes a first hidden layer having five neurons and a second hidden layer having three neurons, all the neurons of the artificial neural network are completely connected, and an activation function of the first and second hidden layers is a tan-sigmoid function, and outputting, by the demodulator, a first binary data signal includes: reading ON/OFF states of the first light source and the second light source; building a learning data set for the artificial neural network on the basis of the ON/OFF states; obtaining an output of the artificial neural network using the learning data set as an input; obtaining, if an error in the output does not satisfy a targeted error, an output of the artificial neural network using the learning data set as an input after updating weighting factors of the artificial neural network by backpropagation; and outputting, if the error in the output satisfies the targeted error, the XOR value or the NXOR value of the ON/OFF states of the first light source and the second light source.

In an embodiment, the optical wireless communication method further includes receiving an input of a first binary data signal, decoding the first binary data signal at a code rate of 1/2, and outputting the second binary data signal, by a line decoder, wherein the line decoder outputs a binary value 0 when the input signal is a binary value (0, 0) or (1, 1) and a binary value 1 when the input signal is a binary value (0, 1) or (1, 0), or a binary value 1 when the input signal is a binary value (0, 0) or (1, 1) and a binary value 0 when the input signal is a binary value (0, 1) or (1, 0).

The present invention includes a program stored in a medium to execute a method according to an embodiment of the present invention in a computer.

The present invention includes a computer-readable recording medium recording a program for executing a method according to an embodiment of the present invention in a computer.

Advantageous Effects

According to the present invention, wireless communication can be performed using an LED and an image sensor, and particularly, communications between vehicles using taillights of the vehicles, smart phones and the like can be efficiently performed.

BEST MODE FOR CARRYING OUT THE INVENTION

Hereinafter, preferred embodiments of the present invention will be described in detail with reference to the accompanying drawings to clarify the spirit of the present invention. In describing the present invention, when it is determined that specific description of already known functions or constitutional components related to the present invention may make the gist of the present invention unclear, detailed description thereof will be omitted. Whenever possible, the same reference numerals and symbols are assigned to the constitutional components practically having the same functional configuration in the drawings although they are shown in different drawings. For the convenience of explanation, apparatuses and methods are described together in case of necessity.

Figure 1:
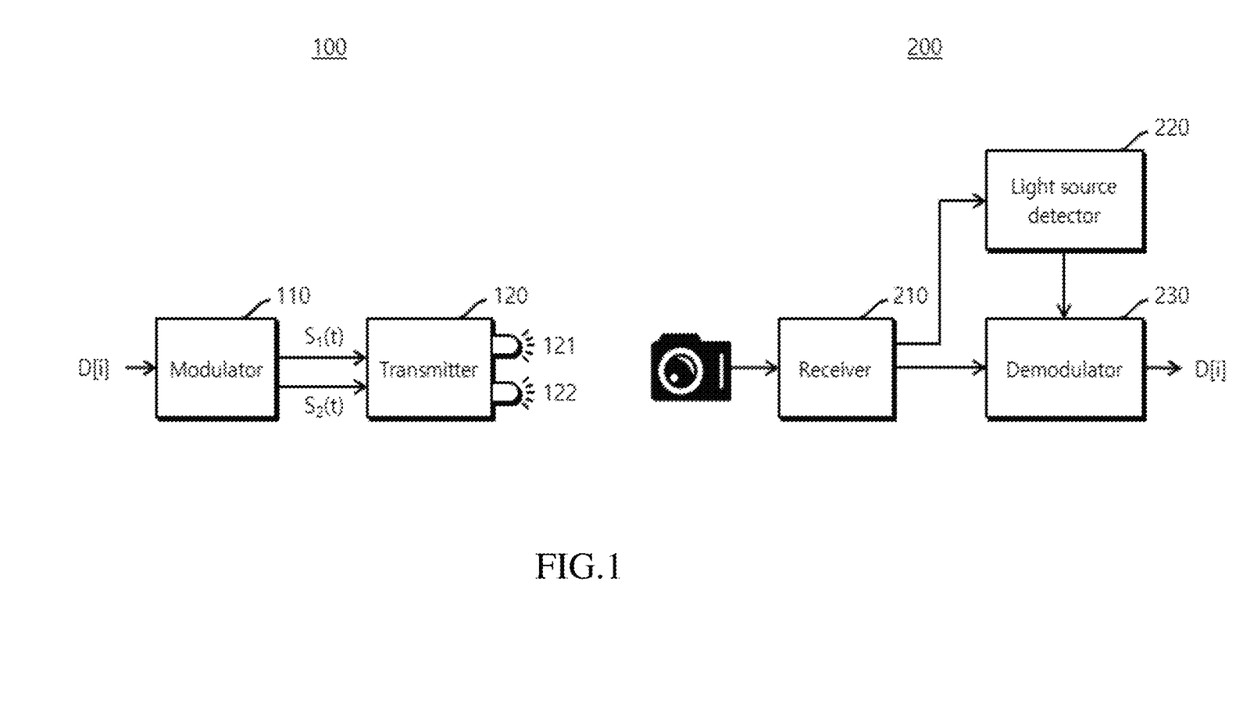
FIG. 1 is a view schematically showing the configuration of an optical wireless communication system according to an embodiment of the present invention.

FIG. 1 is a view schematically showing the configuration of an optical wireless communication system according to an embodiment of the present invention. Referring to FIG. 1, an optical wireless communication system according to an embodiment of the present invention includes an optical wireless transmitting device 100 and an optical wireless receiving device 200. The optical wireless transmitting device 100 includes a modulator 110 and a transmitter 120, and the optical wireless receiving device 200 includes a receiver 210 and a demodulator 230 and may additionally include a light source detector 220. The modulator 110 receives an input of a binary data signal D[i], which is a bit sequence to be transmitted, and generates binary data signals $S_1(t)$ and $S_2(t)$ having a modulated pulse waveform. Here, $S_1$ and $S_2$ may be continuous signals or discrete signals, and hereinafter, it will be described assuming that they are continuous signals.

The transmitter transmits data by turning on and off a first light source 121 and a second light source 122 according to the binary data signals $S_1(t)$ and $S_2(t)$. Here, turning on and off does not necessarily mean a method of completely turning on and off a light source, but includes all methods of expressing two states of 0 and 1 using change of brightness of the light source. If a frequency of turning on and off a light source is higher than a predetermined value (e.g., 200 Hz), a human being does not feel ON/OFF of the light source. The receiver 210 receives an image sequence of light sources continuously photographed (sampled) by an image sensor. The light source detector 220 detects positions of light sources from a received image. The demodulator 230 demodulates data signals from the ON/OFF states of the light sources.

In the present invention, the transmitter 120 transmits data using two or more light sources, and a case of using two light source will be described hereinafter for the convenience of explanation. Using a plurality of light source like this is to efficiently perform optical wireless communication by spatially separating data signals and reference signals.

Describing more specifically, in implementing the optical wireless communication, the main considerations are as described below. First, it should be considered whether or not the optical wireless communication may support both a global shutter method and a rolling shutter method. That is, a communication method that can be used for both a camera of a global shutter method and a camera of a rolling shutter method is preferable. Second, change of frame rate should be considered. In an apparatus operating on the basis of a general OS, the frame rate of an image sensor is not constant and varies according to the state of using resources by the OS. For example, in the case of a camera of a smart phone, the frame rate varies approximately between 20 fps and 30 fps. Accordingly, it is preferable that an optical wireless communication method supports such a variable frame rate. Third, the optical wireless communication has many use cases of travelling transmitters or receivers, and particularly in the case of communication between vehicles, since a transmitting and receiving apparatus moves at a high speed of 10 m/s or faster, it is highly probable that a noise environment greatly varies in the images continuously photographed by an image sensor. Accordingly, it is preferable that the optical wireless communication method is capable of dealing with abrupt change of noises.

Figure 2:
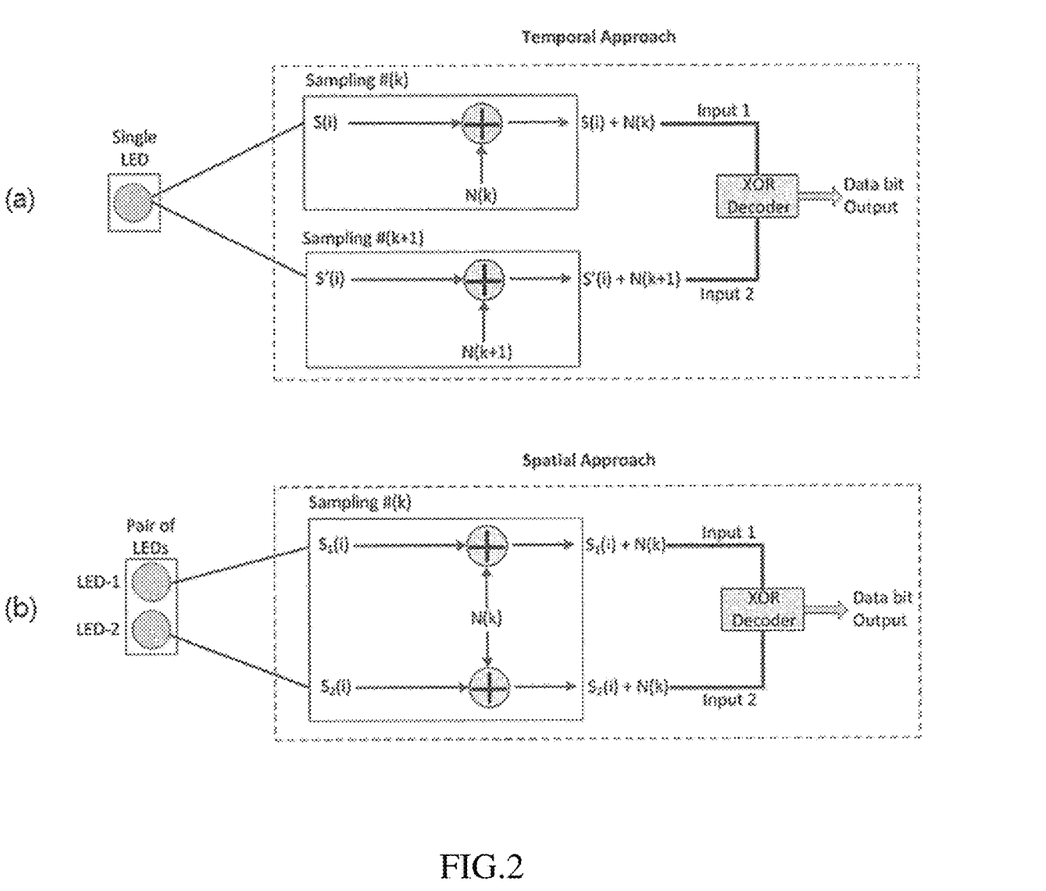
FIG. 2 is a view comparing an optical wireless communication method using one light source and an optical wireless communication method using two light sources.

FIG. 2 is a view comparing an optical wireless communication method using one light source and an optical wireless communication method using two light sources. In FIG. 2, S(i) denotes a transmission signal, and N(k) denotes a sampling noise. By the nature of asynchronous communications, bit index i of a transmission signal may be different from sampling index k. Referring to (a) of FIG. 2, since there is one light source, reference signal S(i) and data signal S'(i) are transmitted in a temporally separated state. Accordingly, sampling time points of the reference signal and the data signal are different, i.e., k and k+1, and noises are also different, i.e., N(k) and N(k+1). Therefore, when modulation is performed by comparing the reference signal S(i) and the data signal S'(i), noise environments of the two signals may be different greatly, and communication performance is lowered according thereto. In addition, when one light source is used like this, it is difficult to deal with the rolling shutter method and frame rate change.

Contrarily, referring to (b) of FIG. 2, since there are two light sources, reference signal S(i) and data signal S'(i) may be spatially separated and simultaneously transmitted. Since sampling of the signals simultaneously occurs, noises of the signals are the same, i.e., N(k). Accordingly, the spatially separating method using a plurality of light sources like this may further effectively perform communications in a situation of rapidly changing environments, such as communications between vehicles. As will be described below, the present invention according to the spatially separating method may demodulate data without being affected by the rolling shutter effect and frame rate change.

Figure 3:
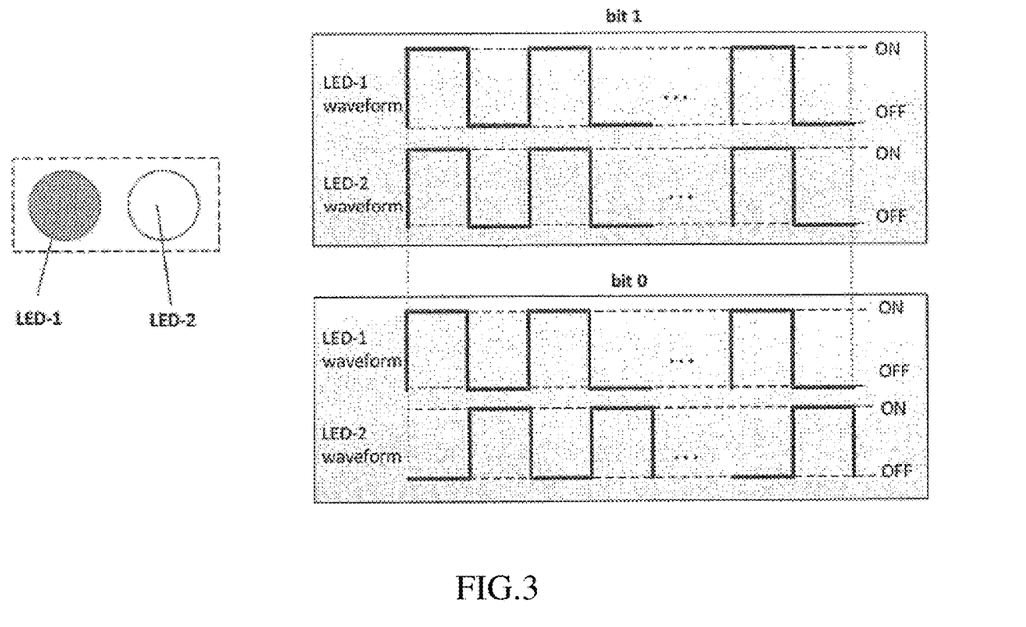
FIG. 3 is a view showing the modulation method of an optical wireless communication system according to an embodiment of the present invention.

FIG. 3 is a view showing the modulation method of an optical wireless communication system according to an embodiment of the present invention. Referring to FIG. 3, among the two light sources turned on and off according to the signals $S_1(t)$ and $S_2(t)$ generated by the modulator 110, the first light source 121 is a reference light source, and the second light source 122 is a data light source. The data light source is a light source turned on and off by a data signal on which a data to be actually transmitted is loaded, and the reference light source is a light source turned on and off according to a reference signal periodically repeating binary value 0s and 1s.

The reference signal $S_1(t)$ which turns on and off the reference light source is a pulse train signal periodically repeating binary value 0s and 1s, and its waveform may be expressed as Equation 1. In the equation, T denotes the pulse cycle of the reference signal, N pulses are included in a bit interval, and k is a natural number from 1 to N.

$$S_1(t) = \begin{cases} 1, & (k-1)T \le t < \left(k-\frac{1}{2}\right)T \\ 0, & \left(k-\frac{1}{2}\right)T \le t < kT \end{cases}$$ [Equation 1]

Meanwhile, the data signal $S_2(t)$ which turns on and off the data light source is a pulse train signal having a frequency the same as that of the reference signal $S_1(t)$, and if a data to be transmitted, i.e., an input data signal D[i], is 0, the data signal has a phase the same as that of the reference signal $S_1(t)$, and if the input data signal D[i] is 1, the data signal has a phase opposite to the phase of the reference signal $S_1(t)$.

Figure 4:
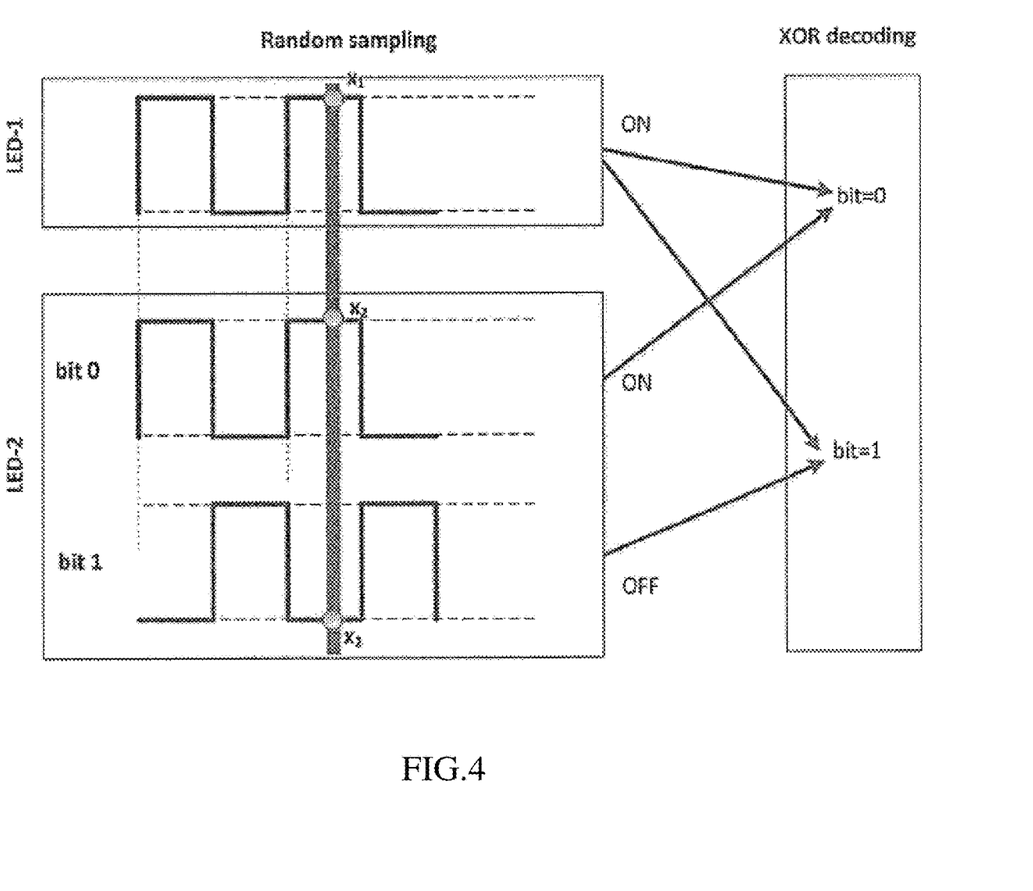
FIG. 4 is a view showing the demodulation method of an optical wireless communication system according to an embodiment of the present invention.

FIG. 4 is a view showing the demodulation method of an optical wireless communication system according to an embodiment of the present invention. Referring to FIG. 4, the demodulator 230 compares ON/OFF states, i.e., phases, of the first light source and the second light source in a sampled image. At this point, the demodulator 230 may use positions of the first light source and the second light source detected by the light source detector 220. The demodulator 230 outputs a binary value 0 if the phases of the two light sources are the same and outputs a binary value 1 if the phases of the two light sources are opposite. That is, the demodulator 230 performs demodulation by an XOR operation on the ON/OFF states of the two light sources as shown in Equation 2. In the equation, $S_1(k)$ and $S_2(k)$ are respectively an ON/OFF state of each light source in the k-th image.

$$\text{bit} = \text{XOR}\{S_1(k);S_2(k)\}$$ [Equation 2]

In a simple word, the demodulator 230 outputs a binary value 0 if both of the two light sources are turned on or turned off in a sampled image and outputs a binary value 1 if one of the two light sources is turned on. Accordingly, the optical wireless receiving device 200 does not need to know which one is a reference light source and which one is a data light source among the two light sources for the purpose of demodulation. In addition, since two light sources photographed in one image are compared, it is not affected although there is a change in the frame rate of the image sensor. However, the frame rate should be higher than the frequency of the data clock.

It is described above that if the input data signal is 0, data signal $S_2(t)$ has a phase the same as that of reference signal $S_1(t)$, and if the input data signal is 1, data signal $S_2(t)$ has a phase opposite to the phase of reference signal $S_1(t)$. However, an opposite case may also be considered. That is, the modulator 110 may perform modulation in such a manner that data signal $S_2(t)$ has a phase the same as that of the reference signal $S_1(t)$ if the input data signal is 1 and has a phase opposite to the phase of the reference signal $S_1(t)$ if the input data signal is 0. In this case, the demodulator 230 performs demodulation by an NXOR operation, instead of XOR operation, in Equation 2. Hereinafter, the former is referred to as a first modulation method, and the latter is referred to as a second modulation method, and it will be described on the basis of the first modulation method unless otherwise mentioned. The first modulation method and the second modulation method are only a problem of selecting a phase with respect to a data value, they correspond to practically the same technical spirit.

The optical wireless receiving device 200 according to an embodiment of the present invention may use two-phase neural network training to reduce the error generated by the noise environment. A two-phase neural network is configured of a first step of detecting positions of light sources and a second step of performing an XOR operation.

In a use case of communication between vehicles, it needs to correctly detect and track a light source in real-time since there is a fairly large movement (⅓ meters or more) during a sampling interval, and it is very difficult to detect and group a pair of light sources belonging to a vehicle when brightness of the light sources continuously changes. One of the pair of light sources is ON state and the other is OFF state during the interval of bit 1, and both of the light sources are either ON or OFF state during the interval of bit 0. Fortunately, a periodic bit interval may be learned from the past (i.e., previous images), and an artificial neural network may refer to what it has learned in determining interest features of a light source (e.g., a Region of Interest (RoI), a size of a light source and brightness of ON state). The artificial neural network of the light source detector 220 estimates current positions by obtaining previous positions of the light sources from photographed images. If the artificial neural network finishes learning, a confirmation process may be performed by processing all the images. In addition, when the demodulator 230 performs an XOR operation, it needs to consider that an ON/OFF state of a light source is affected by noise. Since a pair of input values having a noise need an efficient noisy XOR operator, the artificial neural network is also used in this case.

Figure 5:
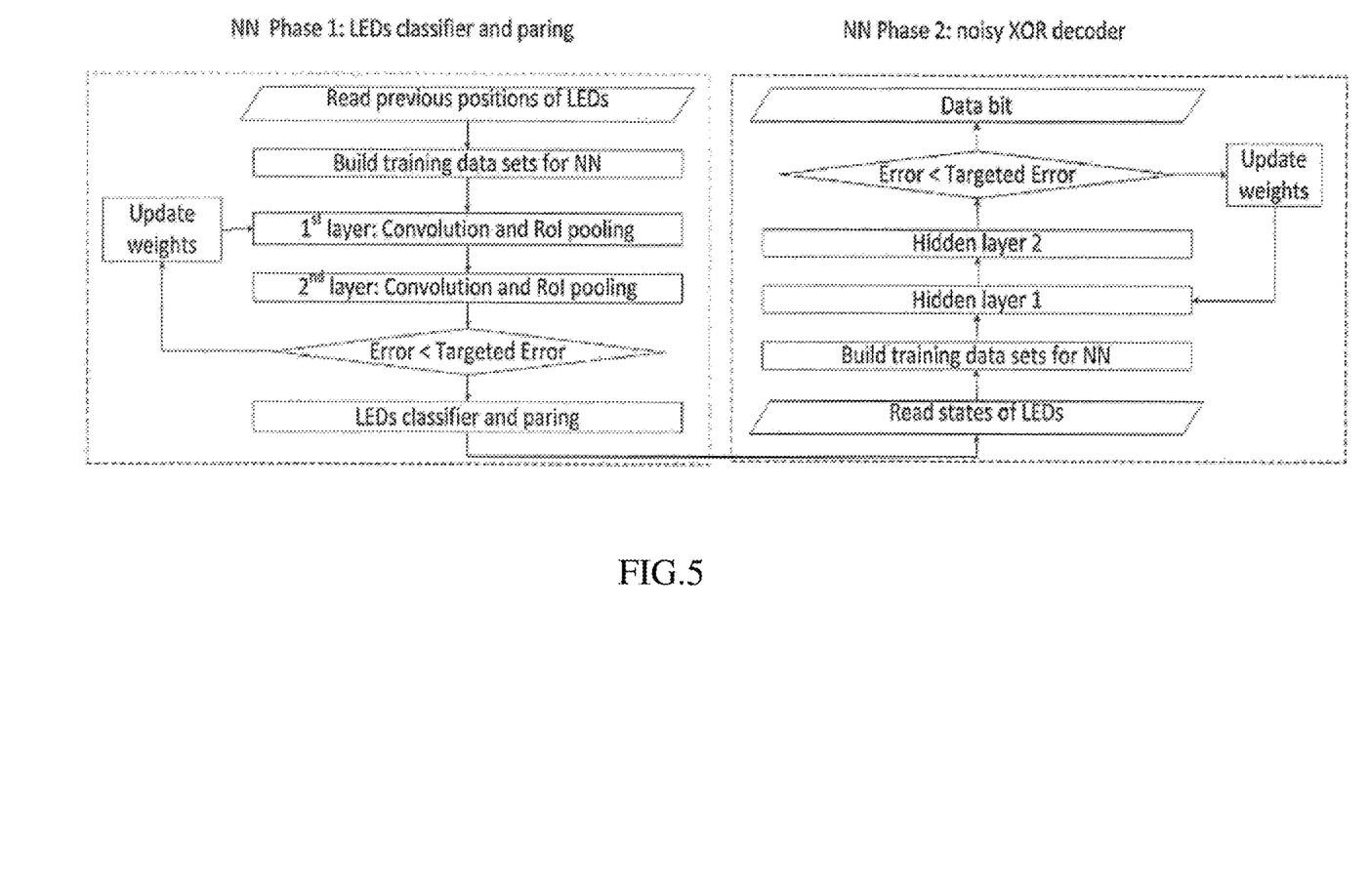
FIG. 5 is a flowchart schematically illustrating the flow of a demodulation method using an artificial neural network according to an embodiment of the present invention.

FIG. 5 is a flowchart schematically illustrating the flow of a demodulation method using an artificial neural network according to an embodiment of the present invention. Referring to FIG. 5, the light source detector 220 includes an artificial neural network for detecting positions of the first light source and the second light source, and the artificial neural network includes a first neuron layer and a second neuron layer. The first neuron layer operates as a filter for outputting a relative RoI, and the second neuron layer determines exact positions of the light sources and groups the light sources in pairs belonging to each vehicle. Each of the first neuron layer and the second neuron layer includes a convolution layer and an RoI pooling layer. The convolution has a property of translational invariant. The convolution layer learns which feature includes light sources. Strength of an output signal has nothing to do with positions of features and simply depends on whether the features exist. Since a bit interval is known, a brightness relation between two light sources of a vehicle can be estimated. Therefore, although a light source pair move to another position, the artificial neural network may still recognize them. An RoI is down-sampled by the RoI pooling layer, and its size is reduced. Sensitivity to noise is also lowered by the RoI pooling. Finally, the RoI pooling is finished if the center of the light sources is detected to have an acceptable error.

The light source detector 220 reads previous positions of the first light source and the second light source, builds a learning data set for the artificial neural network on the basis of the previous positions, and obtains an output of the artificial neural network using the learning data set as an input. If the error in the output does not satisfy a targeted error, weighting factors of the artificial neural network are updated by backpropagation, and the process of obtaining an output of the artificial neural network is repeated again using the learning data set as an input. To detect positions of light sources within an RoI, the artificial neural network uses information that it has learned (including ON/OFF intervals of a light source and relative positions between light source pairs). Without an artificial neural network, positions of light sources in a completely OFF state cannot be detected. If the error in the output satisfies the targeted error, the light source detector 220 outputs the positions of the first light source and the second light source. If positions of two light sources of a vehicle are detected, brightness of the light sources is detected and inputted into the next step. A large data set may be built by augmentation of available data to teach the artificial neural network. When the data is augmented, position shift, change in size, rotation, symmetric transposition and the like of a light source may be used.

Figure 6:
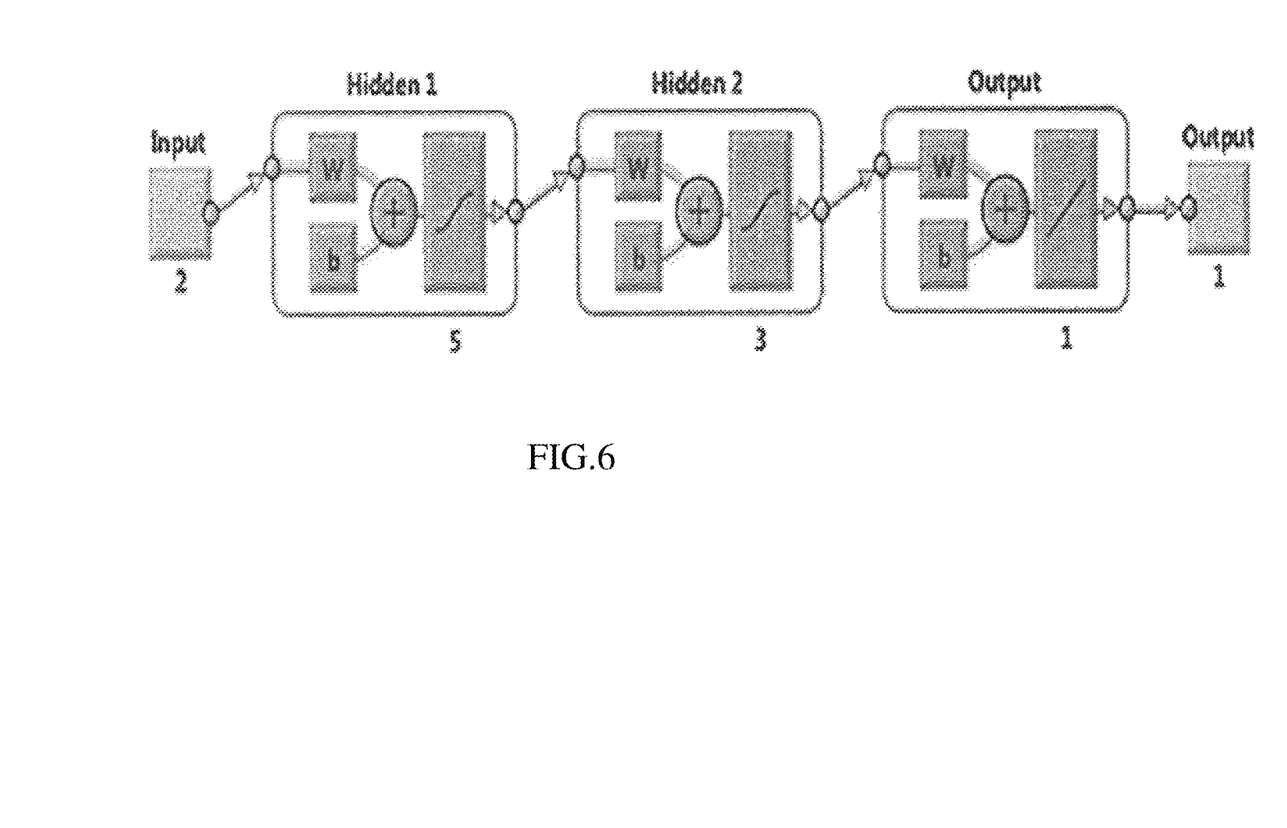
FIG. 6 is a view showing an XOR demodulator using an artificial neural network according to an embodiment of the present invention.

Meanwhile, the demodulator 230 includes an artificial neural network which calculates an XOR value of ON/OFF states of the first light source and the second light source while considering noise. The artificial neural network includes a first hidden layer having five neurons and a second hidden layer having three neurons. All the neurons are completely connected, and the activation function of the first and second hidden layers may be a tan-sigmoid function. The demodulator 230 reads ON/OFF states of the first light source and the second light source, builds a learning data set for the artificial neural network on the basis of the ON/OFF states, and obtains an output of the artificial neural network using the learning data set as an input. If the error in the output does not satisfy the targeted error, weighting factors of the artificial neural network are updated by backpropagation, and the process of obtaining an output of the artificial neural network is repeated using the learning data set as an input. If the error in the output satisfies the targeted error, the light source detector 220 outputs the XOR value or the NXOR value of the ON/OFF states of the first light source and the second light source. A mean square error may be used as the error. FIG. 6 is a view showing an XOR demodulator using an artificial neural network according to an embodiment of the present invention. W denotes a weighting factor, B denotes a bias, and the bias may be considered as a weighting factor.

Figure 7:
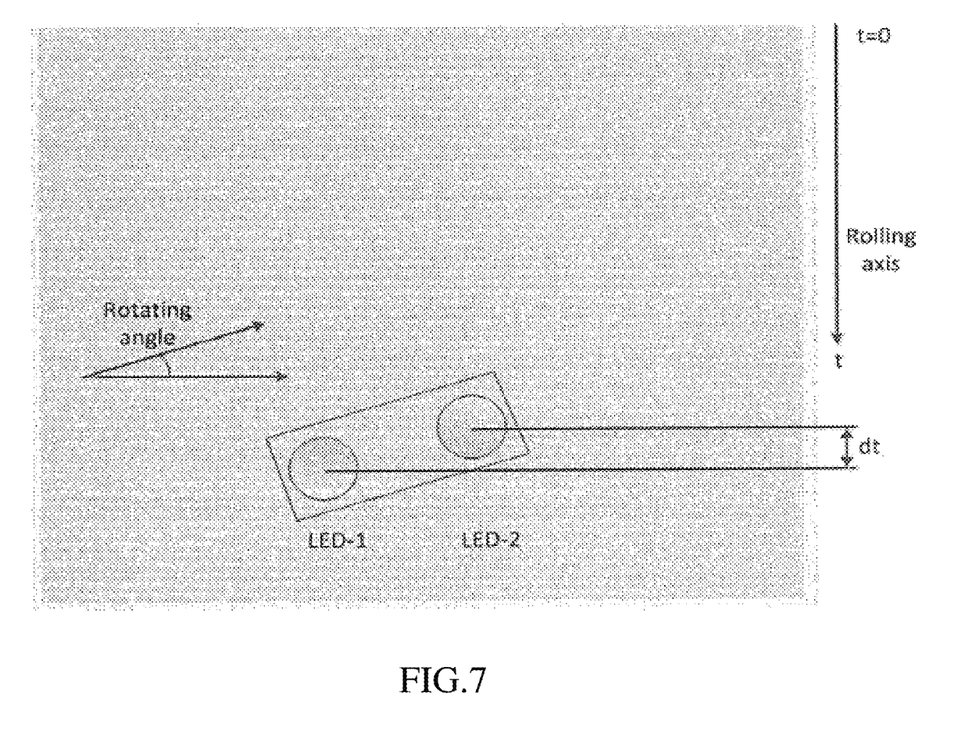
FIG. 7 is a view showing a phenomenon appearing when a plurality of light sources is photographed in a rolling shutter method.

FIG. 7 is a view showing a phenomenon appearing when a plurality of light sources is photographed in a rolling shutter method. Since a time of sampling an image by an image sensor of a rolling shutter method varies row by row, two light sources are sampled simultaneously if they are arranged side by side along the row. Otherwise, there may be a time difference in sampling the two light sources. The sampling time difference dt of the two light sources may be expressed as shown in Equation 3. In the equation, $N_{pixel}$ denotes the number of pixels of the difference between the rows of the two light sources, and $F_s$ denotes the sampling rate of an image sensor for sampling a row. For example, the sampling rate of a Nexus 5× camera is expressed as $F_s$=34.53 kHz.

$$dt = N_{pixel} \times \frac{1}{F_s} \quad \text{[Equation 3]}$$

Since there may be a sampling time difference between the two light sources according to the rotation state or distance of the light sources and the image sensor, this leads to variation of phase difference in ON/OFF of the two light sources, and an errors occurs in the demodulation eventually. That is, although the first light source and the second light source are turned on and off at the same phase as the transmission data is 0, it looks as if a light source is turned on and the other light source is turned off in a sampled image, and the demodulated data may be 1, and although the first light source and the second light source are turned on and off at the opposite phases as the transmission data is 1, it looks as if both of the light sources are turned on or off in a sampled image, and the demodulated data may be 0. In an embodiment of the present invention, additional line coding is used to reduce such an error.

According to an embodiment of the present invention, the optical wireless transmitting device 100 may include a line encoder in front of the modulator 110. The line encoder encodes a binary data signal D[j] at a code rate of 1/2 and outputs a line code according to Table 1, and the modulator 110 receives an input of the line code outputted from the line encoder and generates binary data signals $S_1(t)$ and $S_2(t)$ in a method the same as described above.

TABLE 1

| Input bit | Output code |
|-----------|-------------|
| 0 | 00 |
| 1 | 01 |

In this case, the optical wireless receiving device 200 includes a line decoder behind the demodulator 230, and the line decoder receives a demodulated binary data signal from the demodulator 230 and decodes the demodulated binary data signal according to Equation 4. In the equation, XOR(k) is an output signal of the demodulator 230 and means a binary value demodulated in the k-th image.

$$\text{bit}=\text{XOR}\{\text{XOR}(k);\text{XOR}(k+1)\}=\text{XOR}[\text{XOR}\{s_1(k);s_2(k)\};\text{XOR}\{s_1(k+1);s_2(k+1)\}] \quad \text{[Equation 4]}$$

If line coding like this is used, since a decoded data is determined according to a relative relation between the ON/OFF state of a light source in an image and the ON/OFF state of a light source in a next image, the same result is obtained regardless of an absolute ON/OFF state of a light source. That is, although the ON/OFF phases of the first light source and the second light source of a sampled image are changed to be opposite to the normal phases due to the sampling time difference caused by the rolling shutter effect, in other words, although the two light sources are turned on and off oppositely even though the transmission data is 0 or the two light sources are turned on and off in the same way even though the transmission data is 1, demodulation is normally performed. Accordingly, if line coding like this is used, the optical wireless receiving device 200 does not need to know whether the modulation method of the optical wireless transmitting device 100 is the first modulation method or the second modulation method.

However, demodulation is normally performed only when consecutive two images used by the line decoder for decoding equally have a rolling shutter error, and the error still occurs if only one of the two images has a rolling shutter error. That is, according to the present invention, the error does not occur if the rotation states of the light source and the image sensor are not changed, and the error may occur if the rotation states are changed.

Table 2 and Table 3 are tables showing the effects of line coding. Table 2 shows an effect occurred by the rolling shutter effect when line coding is not applied, and Table 3 shows an effect occurred by the rolling shutter effect when line coding is applied. The underlined parts in the tables show the cases of generating a demodulation error when the phase is changed by the rolling shutter effect.

TABLE 2

| Transmission data | Output of demodulator |
|-------------------|----------------------|
| 010 | 00<u>1</u> |
| 010 | 0<u>01</u> |

As shown in Table 2, if line coding is not applied, an error occurs in a modulated signal as is in case of being affected by the rolling shutter effect.

TABLE 3

| Transmission data | Line code | Output of demodulator | Output of line decoder |
|-------------------|-----------|----------------------|------------------------|
| 010 | 00 01 00 | 00 01 <u>11</u> | 010 |
| 010 | 00 01 00 | 00 0<u>0 11</u> | 0<u>0</u>0 |
| 010 | 00 01 00 | 00 <u>10 11</u> | 010 |

Contrarily, observing Table 3, it is known that if line coding is applied, an error occurs in a decoded signal only when one of two images used by the line decoder for decoding is affected by the rolling shutter affect.

Meanwhile, although the line decoder wrongly groups consecutive two image pairs configuring a line code, there is nothing wrong with decoding. That is, the line decoder should decode in a way of grouping a k-th image and a k+1-th image as a code and grouping a k+2-th image and a k+3-th image as another code. However, although the line decoder decodes in a way of grouping a k−1-th image and a k-th image as a code and grouping a k+1-th image and a k+2-th image as another code, decoding is normally performed. It is since that the line decoder according to the present invention performs decoding by XORing ON/OFF states of consecutive two images. That is, since 0 is outputted when ON/OFF states of the consecutive two images are not changed and 1 is outputted each time a change occurs, although the decoding is performed by shifting images by one image forward or backward, the result will not be changed. This effect is shown in Table 4.

TABLE 4

| Transmission data | Line code | Output of demodulator | Output of line decoder |
|-------------------|-----------|----------------------|------------------------|
| 0100 | 00 01 00 00 | 0 00 <u>11 11</u> 1 | 0<u>1</u>0 |
| 0100 | 00 01 00 00 | 0 00 <u>01 11</u> 1 | 000 |
| 0100 | 00 01 00 00 | 0 0<u>1 01 11</u> 1 | 0<u>1</u>0 |

As shown in Table 4, although image pairs are wrongly grouped and decoded since the line decoder is not synchronized with the line encoder, an error occurs only when only one of the two images is affected by the rolling shutter effect, and the error does not occur if both of the two images are affected by the rolling shutter effect.

A case of performing line coding on the basis of Table 1 is described above, and the same effect may be obtained if any one of four encoding methods is used as shown in Table 5.

TABLE 5

| Input bit | Output code | | | |
|---|---|---|---|---|
| | Method 1 | Method 2 | Method 3 | Method 4 |
| 0 | 00 | 00 | 11 | 11 |
| 1 | 01 | 10 | 01 | 10 |

In addition, although the line encoder uses any one of the four encoding methods as shown in Table 6 and the line decoder decodes by NXORing ON/OFF states of consecutive two images as shown in Equation 5, the same effect may be obtained. All the modulation and demodulation methods according to Tables 5 and 6 and Equations 4 and 5 have practically the same technical spirit.

TABLE 6

| Third binary data | First binary data | | | |
|---|---|---|---|---|
| | Method 1 | Method 2 | Method 3 | Method 4 |
| 0 | 01 | 01 | 10 | 10 |
| 1 | 00 | 11 | 00 | 11 |

$$\text{bit} = N\text{XOR}\{\text{XOR}(k); \text{XOR}(k+1)\} \quad \text{[Equation 5]}$$

Figure 8:
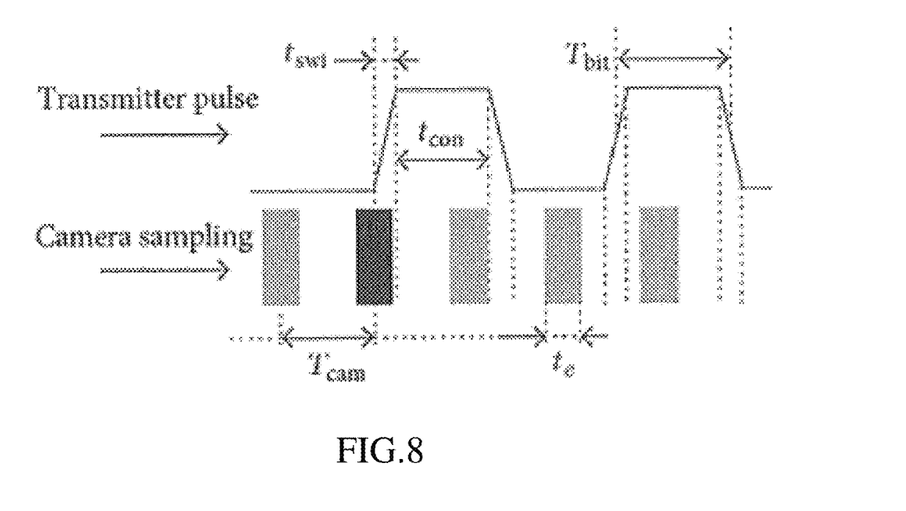
FIG. 8 is a view showing bad-sampling caused by a long exposure time.
Figure 9:
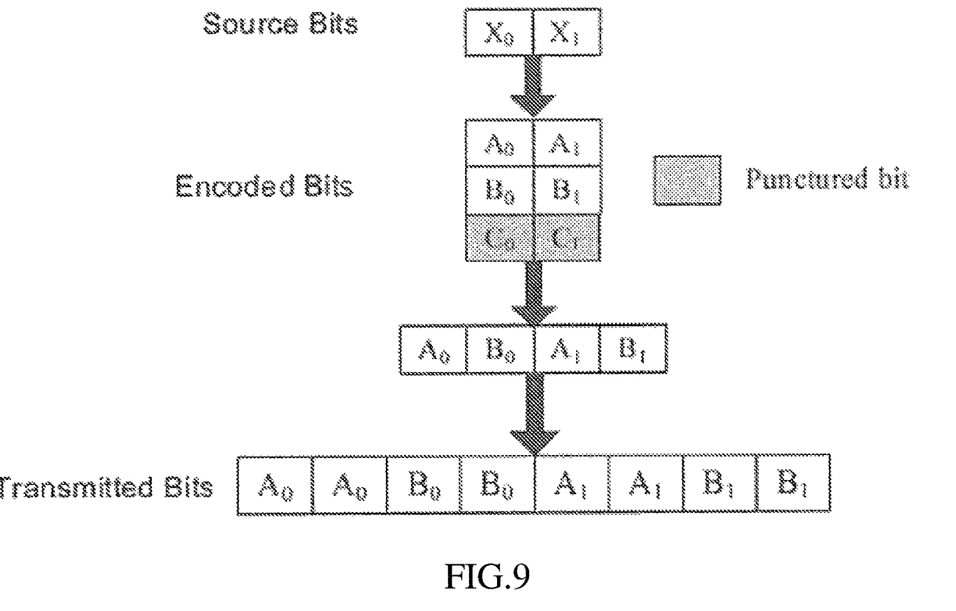
FIG. 9 is a view showing an inner FEC according to an embodiment of the present invention.

FIG. 8 is a view showing bad-sampling caused by a long exposure time. Particularly, an additional error may be occurred by rotation of a light source or an image sensor. This occurs when a light source is sampled at a N-th bit interval and the other light source is sampled at a N+1-th bit interval. To correct such an error, an inner FEC of code rate 1/4 is used according to the IEEE 802.15.7 VLC standard. That is, as shown in FIG. 9, a 1/2 code is obtained by puncturing a 1/3 mother code, and a 1/4 code is obtained by using a simple repetition code.

Since the optical wireless communication system according to the present invention described above is compatible with both a global shutter and a rolling shutter, compatible with a greatly alternating frame rate, applicable to fast movement of a light source or an image sensor, and normally operable although a light source or an image sensor rotates at any angle, it is particularly useful for communications between vehicles.

Figure 10:
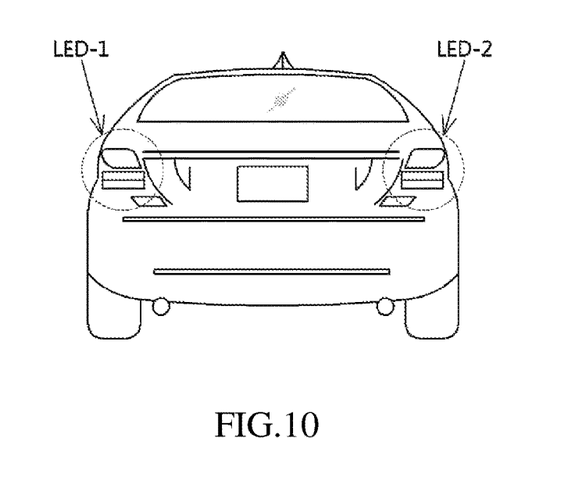
FIGS. 10 and 11 are views showing use cases to which an optical wireless communication system according to an embodiment of the present invention may be applied.
Figure 11:
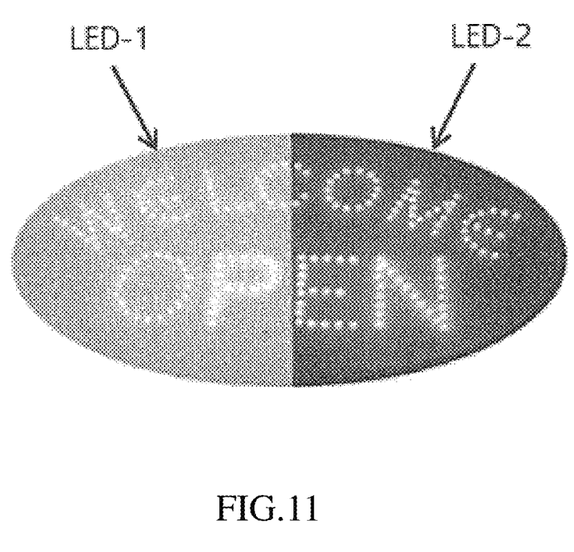

FIGS. 10 and 11 are views showing use cases to which an optical wireless communication system according to an embodiment of the present invention may be applied. If an optical wireless communication system of the present invention is used as shown in FIG. 10, data may be transmitted using an LED taillight of a vehicle, and short identification information or a short message may be exchanged between the vehicles. As shown in FIG. 11, the optical wireless communication of the present invention may be applied by dividing a signboard into left and right sides or upper and lower sides and using the signboard as two light sources. If turning on and off of a light source is sufficiently fast, a human being does not feel ON/OFF of a vehicle taillight or a signboard.

As described above, the optical wireless communication system of the present invention may use three or more light sources, and one of the plurality of light sources may be used as a reference signal, and the other light sources may be used as data signals. The same data signals may be transmitted for diversity, or different data signals may be transmitted to improve transmission speed.

The present invention may be implemented as a computer-readable code in a computer-readable medium. The computer-readable medium includes all storage media including a magnetic storage medium, an optically readable medium, a carrier wave (e.g., transmission through Internet) and the like.

The present invention has been described in detail focusing on the preferred embodiments shown in the drawings. These embodiments are not to restrict the present invention but only illustrative, and should be considered from the descriptive viewpoint, not restrictive viewpoint. The real technical protection scope should be defined by the technical spirit of the appended claims, not by the descriptions stated above. Although specific terms are used in the specification, they are used only for the purpose of describing the concept of the present invention, not to restrict the meaning or limit the scope of the present invention stated in the claims. Therefore, those skilled in the art may understand that various modified forms and equivalent other embodiments are possible without departing from the fundamental spirit of the present invention. It should be understood that the equivalents include equivalents that will be developed in the future, as well as presently known equivalents, i.e., all constitutional components invented to perform the same function regardless of a structure.

The invention claimed is:

1. An optical wireless communication apparatus comprising:
   a line encoder;
   a modulator; and
   a transmitter,
   wherein the line encoder receives a binary input data signal, encodes the binary input data signal at a code rate of 1/2, and outputs a first binary data signal,
   wherein the modulator generates a reference signal periodically repeating binary value 0s and 1s, and receives an input of the first binary data signal, and outputs a second binary data signal,
   wherein the transmitter turns on and off a first light source according to the reference signal and turns on and off a second light source according to the second binary data signal,
   wherein the line encoder outputs a binary value (0, 0) or (1, 1) when the binary input signal is a binary value 0 and a binary value (0, 1) or (1, 0) when the binary input signal is a binary value 1, or a binary value (0, 1) or (1, 0) when the binary input signal is a binary value 0 and a binary value (0, 0) or (1, 1) when the binary input signal is a binary value 1, and
   wherein the second binary data signal has a frequency the same as that of the reference signal, and a phase the same as that of the reference signal when the first binary data signal is a binary value 0 and a phase opposite to that of the reference signal when the first binary data signal is a binary value 1, or a phase the same as that of the reference signal when the first binary data signal is a binary value 1 and a phase opposite to that of the reference signal when the first binary data signal is a binary value 0.

2. The apparatus according to claim 1, wherein the second binary data signal has a phase the same as that of the reference signal when the first binary data signal is a binary value 0 and a phase opposite to that of the reference signal when the first binary data signal is a binary value 1.

3. The apparatus according to claim 1, wherein the line encoder outputs a binary value (0, 0) when the binary input signal is a binary value 0 and a binary value (0, 1) when the binary input signal is a binary value 1.

4. The apparatus according to claim 1, wherein the modulator receives an input of a third binary data signal and outputs a fourth binary data signal, wherein
the fourth binary data signal has a frequency the same as that of the reference signal, and a phase the same as that of the reference signal when the third binary data signal is a binary value 0 and a phase opposite to that of the reference signal when the third binary data signal is a binary value 1, or a phase the same as that of the reference signal when the third binary data signal is a binary value 1 and a phase opposite to that of the reference signal when the third binary data signal is a binary value 0; and
the transmitter turns on and off a third light source according to the fourth binary data signal.

5. An optical wireless communication apparatus comprising:
a receiver;
a demodulator,
wherein the receiver receives consecutively photographed images and the demodulator outputs a first binary data signal of a binary value 0 when an ON/OFF phase of a first light source on the images is the same as an ON/OFF phase of a second light source on the images and a binary value 1 when the ON/OFF phase of the first light source is opposite to the ON/OFF phase of the second light source, or a binary value 1 when the ON/OFF phase of the first light source is the same as the ON/OFF phase of the second light source and a binary value 0 when the ON/OFF phase of the first light source is opposite to the ON/OFF phase of the second light source, on the basis of the images; and
a line decoder for receiving an input of the first binary data signal, decoding the first binary data signal at a code rate of 1/2, and outputting a second binary data signal,
wherein the line decoder outputs a binary value 0 when the input signal is a binary value (0, 0) or (1, 1) and a binary value 1 when the input signal is a binary value (0, 1) or (1, 0), or a binary value 1 when the input signal is a binary value (0, 0) or (1, 1) and a binary value 0 when the input signal is a binary value (0, 1) or (1, 0).

6. The apparatus according to claim 5, wherein the demodulator outputs the first binary data signal of a binary value 0 when the ON/OFF phase of the first light source on the images is the same as the ON/OFF phase of the second light source on the images and a binary value 1 when the ON/OFF phase of the first light source is opposite to the ON/OFF phase of the second light source.

7. The apparatus according to claim 5, further comprising a light source detector for detecting positions of the first light source and the second light source from the images, wherein
the demodulator outputs the first binary data signal on the basis of the detected positions of the first light source and the second light source.

8. The apparatus according to claim 7, wherein the light source detector includes an artificial neural network for detecting the positions of the first light source and the second light source, wherein
the artificial neural network includes a first neuron layer and a second neuron layer, and each of the first neuron layer and the second neuron layer includes a convolution layer and an RoI pooling layer, and
the light source detector reads previous positions of the first light source and the second light source, builds a learning data set for the artificial neural network on the basis of the previous positions, obtains an output of the artificial neural network using the learning data set as an input, obtains, if an error in the output does not satisfy a targeted error, an output of the artificial neural network using the learning data set as an input after updating weighting factors of the artificial neural network by backpropagation, and outputs, if the error in the output satisfies the targeted error, the positions of the first light source and the second light source.

9. The apparatus according to claim 5, wherein the demodulator includes an artificial neural network for calculating an XOR value or an NXOR value of the ON/OFF states of the first light source and the second light source considering noise, wherein
the artificial neural network includes a first hidden layer having five neurons and a second hidden layer having three neurons, all the neurons of the artificial neural network are completely connected, and an activation function of the first and second hidden layers is a tan-sigmoid function, and
the demodulator reads ON/OFF states of the first light source and the second light source, builds a learning data set for the artificial neural network on the basis of the ON/OFF states, obtains an output of the artificial neural network using the learning data set as an input, obtains, if an error in the output does not satisfy a targeted error, an output of the artificial neural network using the learning data set as an input after updating weighting factors of the artificial neural network by backpropagation, and outputs, if the error in the output satisfies the targeted error, the XOR value or the NXOR value of the ON/OFF states of the first light source and the second light source.

10. The apparatus according to claim 5, wherein the line decoder outputs a binary value 0 when the input signal is a binary value (0, 0) or (1, 1) and a binary value 1 when the input signal is a binary value (0, 1) or (1, 0).

11. The apparatus according to claim 5, wherein the receiver receives images photographed in a rolling shutter method.

12. The apparatus according to claim 7, wherein the light source detector detects a position of a third light source from each of the images, and the demodulator outputs a second binary data signal of a binary value 0 when the ON/OFF phase of the first light source is the same as an ON/OFF phase of the third light source and a binary value 1 when the ON/OFF phase of the first light source is opposite to the ON/OFF phase of the third light source, or a binary value 1 when the ON/OFF phase of the first light source is the same as the ON/OFF phase of the third light source and a binary value 0 when the ON/OFF phase of the first light source is opposite to the ON/OFF phase of the third light source, on the basis of positions of the first light source and the third light source.

13. An optical wireless communication method comprising:
receiving a binary input data signal;
encoding the binary input data signal at a code rate of 1/2;
outputting a first binary data signal, by a line encoder;
generating, by a modulator, a reference signal periodically repeating binary value 0s and 1s;

receiving, by the modulator, an input of the first binary data signal;

outputting, by the modulator, a second binary data signal; and turning on and off, by a transmitter, a first light source according to the reference signal, and turning on and off a second light source according to the second binary data signal, wherein, the line encoder outputs a binary value (0, 0) or (1, 1) when the binary input signal is a binary value 0 and a binary value (0, 1) or (1, 0) when the binary input signal is a binary value 1, or a binary value (0, 1) or (1, 0) when the binary input signal is a binary value 0 and a binary value (0, 0) or (1, 1) when the binary input signal is a binary value 1, and wherein the second binary data signal has a frequency the same as that of the reference signal, and a phase the same as that of the reference signal when the first binary data signal is a binary value 0 and a phase opposite to that of the reference signal when the first binary data signal is a binary value 1, or a phase the same as that of the reference signal when the first binary data signal is a binary value 1 and a phase opposite to that of the reference signal when the first binary data signal is a binary value 0.

14. An optical wireless communication method comprising:

receiving, by a receiver, consecutively photographed images from an image sensor;

outputting, by a demodulator, a first binary data signal of a binary value 0 when an ON/OFF phase of a first light source of the images is the same as an ON/OFF phase of a second light source of the images and a binary value 1 when the ON/OFF phase of the first light source is opposite to the ON/OFF phase of the second light source, or a binary value 1 when the ON/OFF phase of the first light source is the same as the ON/OFF phase of the second light source and a binary value 0 when the ON/OFF phase of the first light source is opposite to the ON/OFF phase of the second light source, on the basis of the images, receiving an input of the first binary data signal;

decoding the first binary data signal at a code rate of 1/2; and outputting the second binary data signal, by a line decoder, wherein the line decoder outputs a binary value 0 when the input signal is a binary value (0, 0) or (1, 1) and a binary value 1 when the input signal is a binary value (0, 1) or (1, 0), or a binary value 1 when the input signal is a binary value (0, 0) or (1, 1) and a binary value 0 when the input signal is a binary value (0, 1) or (1, 0).

15. The method according to claim 14, further comprising: detecting, by a light source detector, positions of the first light source and the second light source from the images, wherein outputting a first binary data signal is performed on the basis of the detected positions of the first light source and the second light source.

16. The method according to claim 15, wherein the light source detector includes an artificial neural network for detecting the positions of the first light source and the second light source, wherein the artificial neural network includes a first neuron layer and a second neuron layer, and each of the first neuron layer and the second neuron layer includes a convolution layer and an RoI pooling layer, and detecting, by the light source detector, the positions of the first light source and the second light source includes:

reading previous positions of the first light source and the second light source;

building a learning data set for the artificial neural network on the basis of the previous positions;

obtaining an output of the artificial neural network using the learning data set as an input;

obtaining, if an error in the output does not satisfy a targeted error, an output of the artificial neural network using the learning data set as an input after updating weighting factors of the artificial neural network by backpropagation; and outputting, if the error in the output satisfies the targeted error, the positions of the first light source and the second light source.

17. The method according to claim 14, wherein the demodulator includes an artificial neural network for calculating an XOR value or an NXOR value of the ON/OFF states of the first light source and the second light source considering noise, wherein the artificial neural network includes a first hidden layer having five neurons and a second hidden layer having three neurons, all the neurons of the artificial neural network are completely connected, and an activation function of the first and second hidden layers is a tan-sigmoid function, and outputting, by the demodulator, a first binary data signal includes:

reading ON/OFF states of the first light source and the second light source;

building a learning data set for the artificial neural network on the basis of the ON/OFF states;

obtaining an output of the artificial neural network using the learning data set as an input;

obtaining, if an error in the output does not satisfy a targeted error, an output of the artificial neural network using the learning data set as an input after updating weighting factors of the artificial neural network by backpropagation; and outputting, if the error in the output satisfies the targeted error, the XOR value or the NXOR value of the ON/OFF states of the first light source and the second light source.

* * * * *